United States Patent
Rosch et al.

(10) Patent No.: US 10,740,806 B2
(45) Date of Patent: Aug. 11, 2020

(54) MERCHANT RATING DETERMINATION SYSTEM

(71) Applicant: PAYPAL, INC., San Jose, CA (US)

(72) Inventors: Matthias Patrick Rosch, Berlin (DE); Thomas Fletcher, Berlin (DE); Anton Voitovych, Berlin (DE)

(73) Assignee: PAYPAL, INC., San Jose, CA (US)

( * ) Notice: Subject to any disclaimer, the term of this patent is extended or adjusted under 35 U.S.C. 154(b) by 634 days.

(21) Appl. No.: 15/168,873

(22) Filed: May 31, 2016

(65) Prior Publication Data

US 2017/0345065 A1    Nov. 30, 2017

(51) Int. Cl.
*G06Q 30/02*    (2012.01)

(52) U.S. Cl.
CPC ..... *G06Q 30/0282* (2013.01); *G06Q 30/0283* (2013.01)

(58) Field of Classification Search
CPC ..... G06Q 30/0283; G06Q 50/01; G06Q 50/12
USPC ........................................................ 705/347
See application file for complete search history.

(56) References Cited

U.S. PATENT DOCUMENTS

| | | | |
|---|---|---|---|
| 2009/0005079 A1 | 1/2009 | Shields et al. | |
| 2009/0319436 A1* | 12/2009 | Andra | G06F 17/2785 705/80 |
| 2011/0238755 A1* | 9/2011 | Khan | H04W 4/21 709/204 |
| 2013/0150086 A1* | 6/2013 | Caralis | G06Q 30/0631 455/456.3 |
| 2014/0164151 A1* | 6/2014 | Hockley | G06Q 50/12 705/15 |
| 2014/0279098 A1 | 9/2014 | Ham | |
| 2014/0365944 A1* | 12/2014 | Moore | G06F 3/0484 715/772 |
| 2015/0046320 A1 | 2/2015 | Baldwin | |
| 2015/0134439 A1 | 5/2015 | Maxwell et al. | |
| 2015/0170227 A1* | 6/2015 | Kates | G06Q 30/0282 705/347 |
| 2015/0254627 A1 | 9/2015 | Bell et al. | |
| 2015/0254717 A1* | 9/2015 | Goto | G06Q 30/0255 705/14.53 |
| 2016/0078389 A1* | 3/2016 | Kim | G06Q 50/12 705/7.42 |
| 2016/0219098 A1 | 7/2016 | Baca et al. | |
| 2017/0032385 A1* | 2/2017 | Thomas | G06Q 30/0201 |
| 2017/0132584 A1 | 5/2017 | Birukov et al. | |

(Continued)

OTHER PUBLICATIONS

"Divorcing Wife. Thanks iPhone 4s and Find My Friends," MacRumors [online], Oct. 15, 2011, available at: < https://forums.macrumors.com/threads/divorcing-wife-thanks-iphone-4s-and-find-my-friends.1254206/ > (Year: 2011).*

(Continued)

*Primary Examiner* — Dennis W Ruhl
*Assistant Examiner* — Richard W. Crandall
(74) *Attorney, Agent, or Firm* — Haynes and Boone, LLP

(57) ABSTRACT

Systems, methods, and computer program products are disclosed for correlating tip amounts to merchant ratings. In a generalized method, a merchant tip amount may be entered via a user interface. Based upon the merchant tip amount, the system then determines a corresponding merchant rating. Accordingly, merchant ratings and tips are seamlessly integrated with one another.

20 Claims, 5 Drawing Sheets

(56) References Cited

U.S. PATENT DOCUMENTS

2017/0255956 A1* 9/2017 Woodruff .......... G06Q 10/0639

OTHER PUBLICATIONS

"Divorcing Wife. Thanks iPhone 4s and Find My Friends," MacRumors [online], Oct. 15, 2011, available at: < https://forums.macrumors.com/threads/divorcing-wife-thanks-iphone-4s-and-find-my-friends.12542 > (Year: 2011).*

Yelp—Green Dot Stables [online], archived at: < https://web.archive.org/web/20140105092446/https://www.yelp.com/biz/green-dot-stables-detroit-2>, archived on Jan. 5, 2014 (Year: 2014).*

Yelp—Support Center [online], archived at: < https://web.archive.org/web/20150208025417/https://www.yelp-support.com/article/How-do-I-edit-one-of-my-reviews?l=en_US>, archived on Feb. 8, 2015 (Year: 2015).*

Sullivan, Mark, "A Brief History of GPS," [online] PCWorld.com, published Aug. 9, 2012, available at: < https://www.pcworld.com/article/2000276/a-brief-history-of-gps.html > (Year: 2012).*

Mediati, Nick, "How to share files on iOS7 using AirDrop," MacWorld [online], published on Sep. 18, 2013, available at: < https://www.macworld.com/article/2048903/how-to-share-files-on-ios-7-using-airdrop.html > (Year: 2013).*

Carr, Austin, "How Square Register's UI Guilts You Into Leaving Tips," Fast Company, [online] Dec. 12, 2013, available at: https://www.fastcompany.com/3022182/how-square-registers-ui-guilts-you-into-leaving-tips (Year:2013).

\* cited by examiner

MERCHANT RATING DETERMINATION SYSTEM

BACKGROUND

The present disclosure generally relates to interactive communication systems and, more particularly, to systems and methods that determine a merchant rating.

Giving a tip to a merchant is the most direct and honest way to show your appreciation for good service. Perhaps the tip is given to the waitress that gave you an extra scoop of ice cream or the taxi driver that helped you carrying your heavy suitcases. You rate the service by giving an average or high tip, or maybe even no tip at all. However, if a patron is unfamiliar with local customs, he or she may not know what a customary average or high tip amount would be.

In addition, some patrons give a star rating to merchants. However, the star ratings have become meaningless since it is common practice to give 5 stars to anyone that gave average service and 1 star if the slightest aspect of the service was unsatisfactory. Yet, many patrons still rely on these somewhat unreliable star ratings when choosing a service merchant. Moreover, today many fake or dummy merchant reviews are posted on various consumer sites, further misleading consumers.

Figure 1:
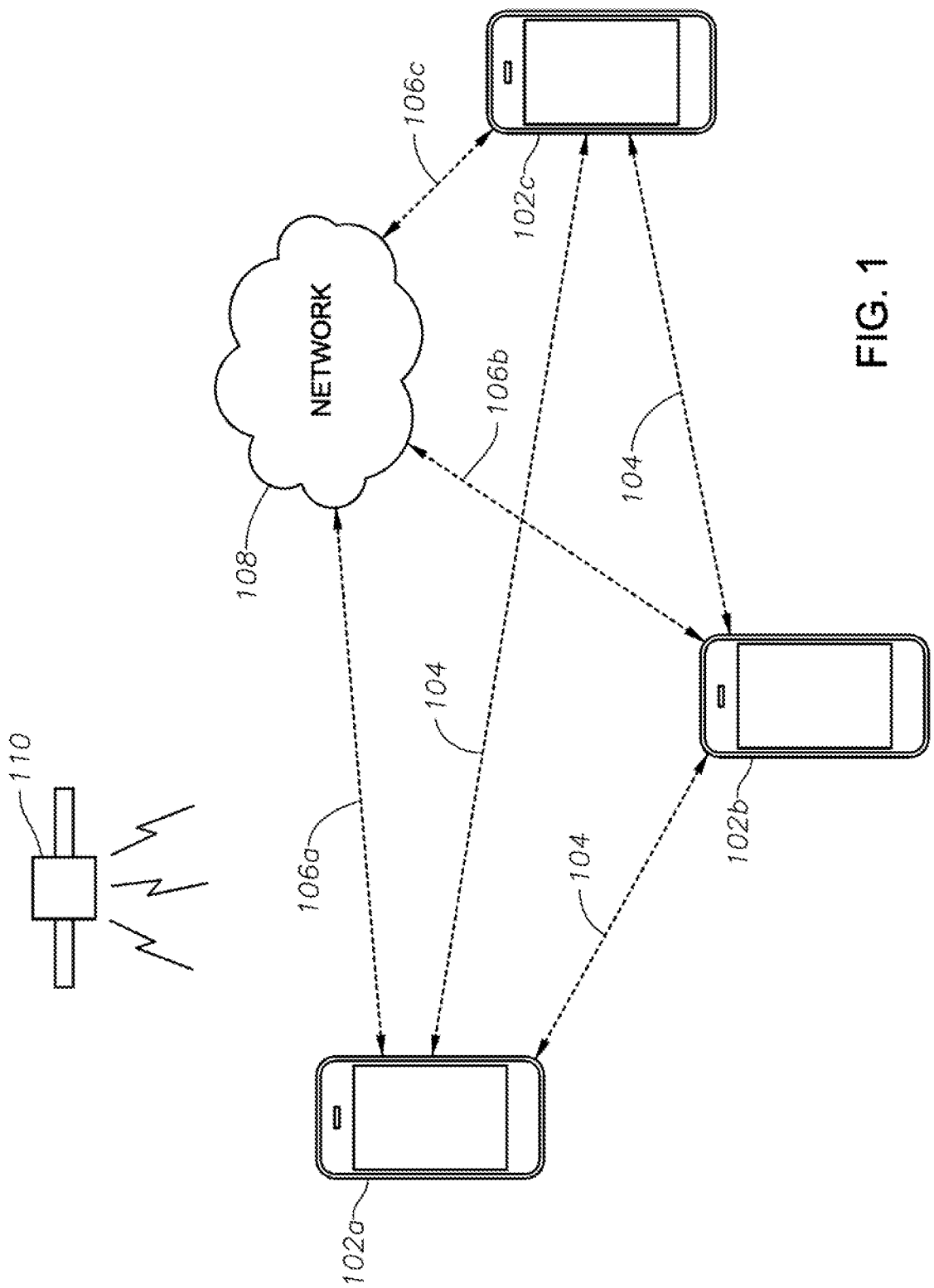
FIG. 1 is a diagram of an exemplary communications environment according to embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION OF ILLUSTRATIVE EMBODIMENTS

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those ordinarily skilled in the art having the benefit of this disclosure that these concepts may be practiced without these specific details. In some instances, well-known structures and components are shown in block diagrammatical form in order to avoid obscuring such concepts.

The present disclosure provides systems, methods, and non-transitory computer readable media for correlating merchant ratings to tipping amounts and vice versa. The merchants described herein may relate to a variety of merchant providers, such as, for example, restaurants, cafes, transportation providers, waitresses, barristers, etc. In a generalized method of the present disclosure, a merchant rating is entered by a user via a user interface. Based upon the merchant rating, the system determines a merchant tip amount, which is then communicated to the user via the interface. Alternatively, in yet another generalized method, a merchant tip amount is entered via the user interface. Based upon the merchant tip amount, the system then determines a corresponding merchant rating. Accordingly, merchant ratings and tips are seamlessly integrated with one another. The determination of a tip amount or rating may be based on various data, including, but not limited to, the type of merchant, user history (e.g., with ratings and/or tips), time of year (e.g., right after a payday, holiday season, right before tax day, etc.), companion(s), occasion, and location, where the data can be obtained from electronic data stored or communicated by user computing/communication devices, such as smart phones.

Referring now to FIG. 1, an embodiment of an exemplary communications environment 100 is illustrated. The communications environment 100 may include a number of mobile communications devices 102, one or more networks 108, and a global navigation satellite system ("GNSS") 110 or other mobile device location detection systems. The communications environment 100 illustrated in FIG. 1 is simplified for the sake of illustration.

The communications environment 100 may support operation on multiple carriers (e.g., waveform signals of different frequencies for wireless communications, or wired communications). As an example, the communications environment 100 may be a multi-carrier LTE network capable of efficiently allocating network resources. The communications environment 100 is one example of a network to which various aspects of the disclosure apply.

The communications environment 100 includes one or more mobile communications devices 102, illustrated in FIG. 1 as mobile communications devices 102a, 102b, and 102c. The mobile communications devices 102a/102b/102c may be, for example, User Equipment ("Ues"). The mobile communications devices 102a/102b/102c may each also be referred to as a terminal, a mobile station, a subscriber unit, etc. A mobile communications device 102 may be a cellular phone, a smartphone, a personal digital assistant, a wireless modem, a laptop computer, a tablet computer, a tag (e.g., RFID tag), etc., to name just a few examples. The mobile communications devices 102a/102b/102c may be location-aware, for example by including circuitry and/or software to enable the mobile communications devices 102a/102b/102c to determine their own locations.

For example, one or more of the mobile communications devices 102a/102b/102c may include circuitry and/or software that enable them to be in communication with the GNSS 110 in order to determine location. The GNSS 110 may be, for example, the Global Positioning System ("GPS"), Galileo, GLONASS, BeiDou, or some other such system that enables the mobile communications devices 102a/102b/102c to determine geolocation information from signals provided by individual satellites of the GNSS 110. The circuitry and/or software of mobile communications devices 102a/102b/102c may additionally or alternatively enable location determination based on other parameters, such as base station triangulation, time of flight measurements, etc.

The mobile communications devices 102a/102b/102c may communicate with each other (as well as other devices) via one or more connections. For example, the mobile communications device 102a may be capable of establishing a peer-to-peer ("P2P") session 104 with one or both of the mobile communications devices 102b and 102c. Similarly, the mobile communications device 102b may be capable of establishing a peer-to-peer session 104 with one or both of the mobile communications devices 102a and 102c. Similarly, the mobile communications device 102c may be capable of establishing a peer-to-peer session 104 with one or both of the mobile communications devices 102a and 102b.

For example, the mobile communications devices 102a/102b/102c may be capable of (e.g., includes one or more associated transceivers for) linking to each other via device-to-device ("D2D") links, such that the P2P sessions 104 may constitute D2D links. As another example, the mobile communications devices 102a/102b/102c may be capable of (e.g., includes one or more associated transceivers for) connecting via Bluetooth or near field communications ("NFC") with each other, to name just a few examples. The mobile communications devices 102a/102b/102c may all establish the same types of P2P sessions 104 with each other (e.g., all using the same linking technology/protocols), or alternatively may use a variety of technologies/protocols in order to establish the P2P sessions 104 in the communications environment 100.

Alternatively, one or more of the mobile communications devices 102a/102b/102c may establish connections to each other via the network 108. For example, the mobile communications device 102a may establish the connection 106a with the network 108, the mobile communications devices 102b may establish the connection 106b with the network 108, and the mobile communications device 102c may establish the connection 106c with the network 108. For example, the mobile communications device 102a may communicate with mobile communications device 102b, via the network 108, by way of the connections 106a and 106b (e.g., the connection 106a constitutes an uplink to the network 108 and the connection 106b a downlink from the network 108). Similarly, the mobile communications device 102 may communicate with mobile communications device 102c, via the network 108, by way of connections 106a and 106c. Similar examples apply with respect to the other mobile communications devices 102b and 102c.

The network 108 may be, for example, a core network, an access network, other network, and/or any combination of networks. The network 108 may include one or more base stations. For example, one or more the base stations may include an evolved Node B ("eNodeB"). A base station may also be referred to as a base transceiver station or an access point. There could be one to many base stations, as well as an assortment of different types such as macro, pico, and/or femto base stations. The base stations may also communicate with one another directly or indirectly, such as via network 108. The network 108 may be an LTE network or a WiFi network, to name just a few examples. The mobile communications devices 102 may use the network 108 to communicate data according to embodiments of the present disclosure. The mobile communications devices 102 may use one or more elements of the network 108 to discover each other, while in other embodiments the mobile communications devices 102 may discover each other through NFC or Bluetooth ad-hoc connections for initial session negotiation and continue communication via NFC or Bluetooth, or alternatively via network 108.

Figure 2:
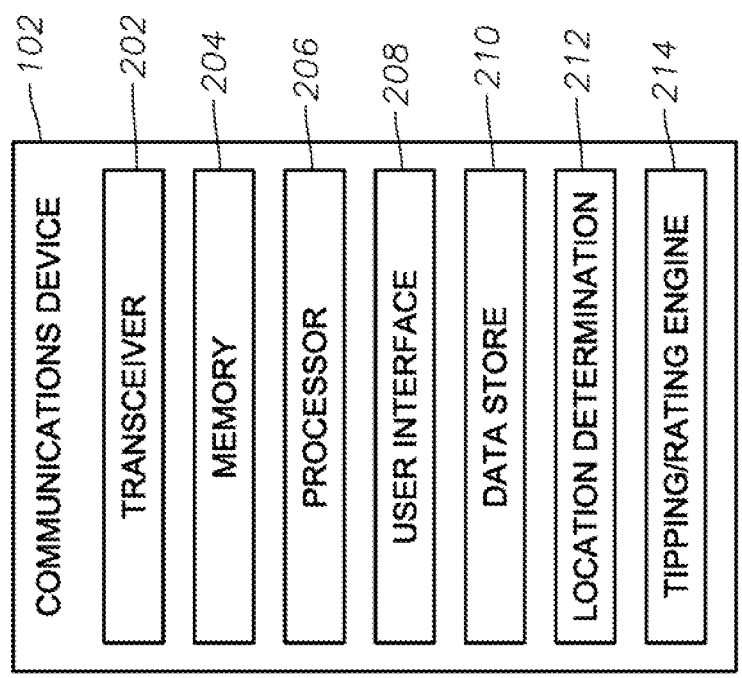
FIG. 2 is a block diagram of an exemplary mobile communications device according to embodiments of the present disclosure.

One exemplary embodiment of the mobile communications devices 102 is depicted in FIG. 2. In FIG. 2, the mobile communication devices 102 include a transceiver 202, a memory 204, a processor 206, a user interface 208, a data store 210, a location determination system 212, and a merchant tipping and rating engine 214. These elements may be in direct or indirect communication with each other, for example via one or more buses.

The transceiver 202 may include a modem subsystem and a radio frequency ("RF") unit and be configured to communicate bi-directionally with other devices, such as, for example, other mobile communications devices 102, network 108, and/or network database storage locations. The memory 204 may include a cache memory (e.g., a cache memory of the processor 206), random access memory ("RAM"), magnetoresistive RAM ("MRAM"), read-only memory ("ROM"), programmable read-only memory ("PROM"), erasable programmable read only memory ("EPROM"), electrically erasable programmable read only memory ("EEPROM"), flash memory, solid state memory device, hard disk drives, other forms of volatile and non-volatile memory, or a combination of different types of memory. In an embodiment, the memory 204 includes a non-transitory computer-readable medium.

The memory 204 may store instructions that, when executed by the processor 206, cause the processor 206 to perform the operations described herein in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor 206 may include a central processing unit ("CPU"), a digital signal processor ("DSP"), an application-specific integrated circuit ("ASIC"), a controller, a field programmable gate array ("FPGA") device, another hardware device, a firmware device, or any combination thereof configured to perform the operations described herein and discussed in more detail below. The processor 206 may also be implemented as a combination of computing devices, e.g., a combination of a DSP and a microprocessor, a plurality of microprocessors, one or more microprocessors in conjunction with a DSP core, or any other such configuration. The processor 206 may be a single processor or multiple processors, where each processor may have one or more processing cores capable of parallel and/or sequential operation.

The user interface 208 may include an input component and an output component. For example, the user interface 208 may include a touchscreen interface that outputs data for visual use as well as receives/processes one or more touches/swipes/gestures and merchant data, etc. to be potentially interpreted according to embodiments of the present disclosure such as discussed with respect to merchant tipping and rating engine 214. Further, the user interface 208 may be used to display one or more notifications, elements of information, and application data according to embodiments of the present disclosure. The user interface 208 may also include one or more lights (e.g., LEDs) separate from a touchscreen, a vibration generator, a speaker, a microphone, input for a mouse, input for a keyboard, etc. useful for providing feedback to a user as well as receiving further input therefrom.

The data store 210 may be, for example, a hard drive, flash drive, storage array, or other type of storage. The data store 210 may store notifications, transferred information, location information, map information, and/or update information (e.g., as an "app").

In an embodiment, the location determination system 212 may include one or more transceivers to enable communication with the GNSS 110 illustrated in FIG. 1. The mobile communications devices 102a/102b/102c may further include assisted-GPS for enhanced signal acquisition/location quality.

The merchant rating and tipping engine 214 may include its own processing circuitry or communicate data to/from processor 206 in order to enable determination of merchant ratings and tip amounts in accordance with the illustrative methods described herein. In general, the user may input merchant rating data via user interface 208. The rating data may include a variety of rating indications, such as, for example, stars, emojis or facial expressions (e.g., that express satisfaction, happiness, dissatisfaction, etc. with a received level of service), or textual wording (e.g., "service was satisfactory," "service was excellent," service was poor," etc.) entered via user interface 208. Once this merchant rating data is received via user interface 208, it is communicated to tipping/rating engine 214, whereby a corresponding merchant tip amount is calculated according to the illustrative methods described herein. Thereafter, the determined tip amount may be communicated to the user via user interface 208.

In an illustrative method of the present disclosure, a user may enter a merchant tip amount via user interface 208. The merchant tip amount may be entered as part of a payment transaction whereby the communications device 102 is used as a payment terminal. The payment transactions may also take place with the aid of an on-line or mobile payment service provider such as, for example, PayPal, Inc. of San Jose, Calif. Once the merchant tip amount is entered via user interface 208, the data is communicated to tipping/rating engine 214, whereby a corresponding merchant rating is determined according to the illustrative methods described herein. The merchant rating may then be communicated to the user via user interface 208, or may be communicated to some local or remote storage database for later use.

Figure 3A:
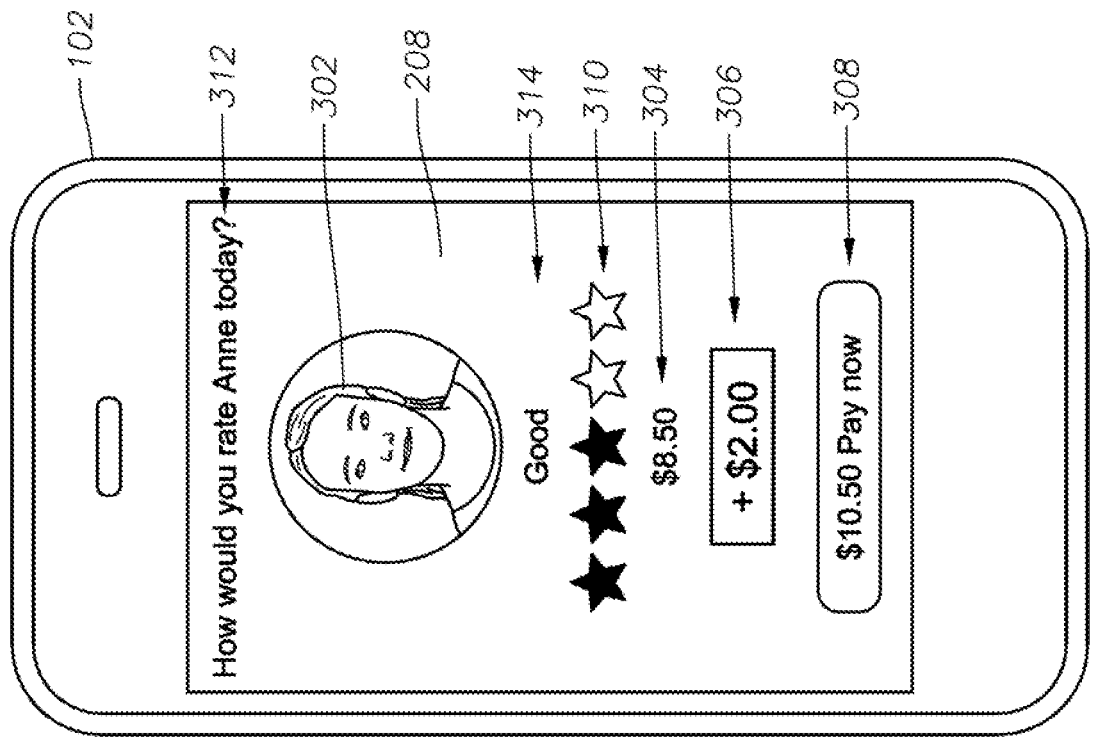
FIGS. 3A, 3B, and 3C illustrate touchscreens of exemplary mobile communications devices according to alternative embodiments of the present disclosure.

Turning now to FIG. 3A, a block diagram is illustrated of an exemplary mobile communications device 102 according to embodiments of the present disclosure. For simplicity of discussion, reference will be made to communications device 102 to include any of mobile communications devices 102a-c from FIG. 1 above, where the mobile communications device 102 is in communication with database storage in network 108 and/or other mobile communications devices 102. This is for simplicity of discussion only.

The mobile communications device 102 may have the components described with respect to FIG. 2 above. FIG. 3A illustrates the touchscreen of the user interface 208, referred to here for simplicity as the touchscreen 208. In this example, touchscreen 208 is used as a payment terminal to process a merchant payment, as well as tip and/or rate a merchant 302. Here, after receiving the bill, a user proceeds to pay the merchant via touchscreen 208. In this embodiment, touchscreen 208 displays a bill amount 304, a tip amount 306 determined using the illustrative methods described herein, and a total bill amount 308.

In this example, after bill amount 304 is determined, communications device 102 prompts the user to rate the merchant at area 312 of touchscreen 208. Then, the user may enter the merchant rating data in a variety of ways. For example, the merchant rating data may be entered as a star rating 310, whereby the user touches or swipes to the desired star rating 310 that corresponds to the level of service received. As the user selects a star rating 310, the textual rating 314 may be displayed as textual wording that corresponds to the star rating 310. In FIG. 3A, the star rating 310 is a 3-star rating which, as determined by communications device 102, is a "good" rating. Moreover, in certain illustrative embodiments, the facial expression (e.g., sad, pleased, excited) of merchant 302 may change to reflect the received rating 310. Moreover, merchant 302 may be illustrated as, for example, an avatar, emoji or an actual picture of the merchant.

After merchant rating 310 is entered via touchscreen 208, the data is communicated to tipping/rating engine 214. Here, processing circuitry (e.g., processor 206) determines the tip amount 306 to suggest to the user. The tip amount 306 may be calculated in a variety of ways based on past transactions, as will be discussed in detail below. Nevertheless, after tip amount 306 is calculated or determined, it is displayed as shown in FIG. 3A (in this example, the tip amount corresponding to the 3-star rating is $0.00).

In a first example, merchant tip amount 306 is determined based upon historical data of the user (e.g., historical tip amounts the user has paid based upon rating data 310). Here, the user would have a data profile containing his or her information (e.g., payment information, age, merchant preferences). The profile may be stored locally or on some remote database in network 108, whereby communications device 102 communicates. In addition to personal information, for example, the user profile would also contain data related to past merchants patronized by the user, and tip amounts paid those merchants for certain levels of service. In one embodiment, only similar type merchants, e.g., fast food, fine dining, coffee house, chain restaurant or hotel, local establishment, car wash, barber, hair stylist, etc., are compared, but in other embodiments, all merchants that the user has tipped and also has a corresponding user rating may be compared. Therefore, in this example, tipping/rating engine 214 retrieves historical tipping data having the same or similar rating data, and outputs this as the suggested tip amount. In FIG. 3A, for example, the historical tip amount for 3-star service was $0.00. Thereafter, the user may opt to pay the suggested tip amount 306 or enter some other customized tip amount.

In a second example, merchant tip amount 306 is determined based upon the presence of a second user in the vicinity of the first user. As previously discussed, communications environment 100 includes a mobile device location detection system 110 used to determine the location of various communication devices on the network. Thus, in one example, a second user carrying a second mobile communications device 102 is accompanying the first user at a merchant location. The presence of the second user within a certain distance (e.g., up to 5 ft) may be determined using mobile device location detection system 110, an NFC technique, or other suitable location detection technique. Like the first user, the second user may also have a user profile. Thereafter, communications device 102 retrieves the profiles of the first and second user to determine the historical amount the first user has paid when accompanied by the second user. Once determined, communications device 102 outputs the historical tip amount as suggested tip amount 306.

In a third example, merchant tip amount 306 is determined based upon the historical tip amounts paid by a user similar to the first user. This is useful in situations where the first user does not have a historical profile. Here, communications device 102 will analyze the user profile of the first user for personal information describing the first user (e.g., age, food preferences, service preferences, etc.) and then locate a second user having a profile matching or substantially matching the first user. Once located, communications device 102 will output the historical tip amount the second user has paid for 3-star rating 310 as the merchant tip amount 306.

In a fourth example, merchant tip amount 306 is determined based upon the location of communications device 102. This method is useful in instances, for example, where the user is traveling in an area where he or she does not understand the customary tipping practices. Here, again the location of communications device 102 is determined using any of the device location detection techniques described herein. Thereafter, communications device 102 retrieves historical merchant data from local or remote storage corresponding to the merchant being patronized or merchants in the location of communications device 102 to determine the customary tip amount for rating data 310. The local merchants may be similar in star ratings, food types, elegance, etc. The historical data is then output as the suggested tip amount 306.

Figure 3C:
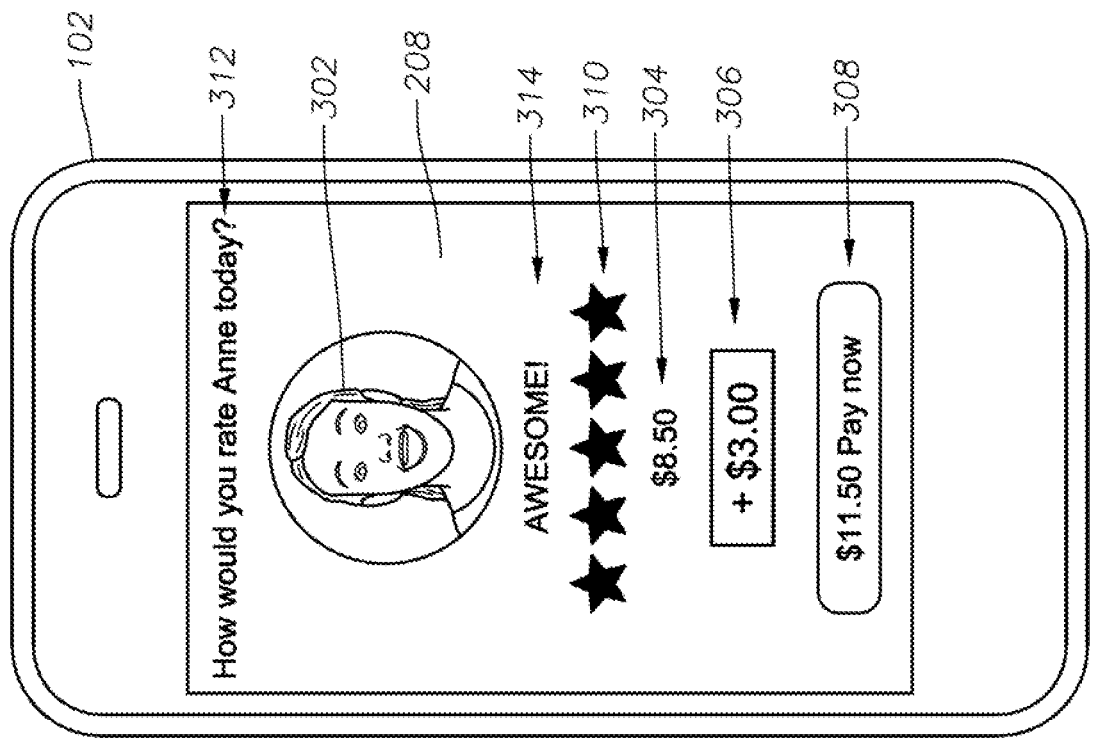
Figure 3B:
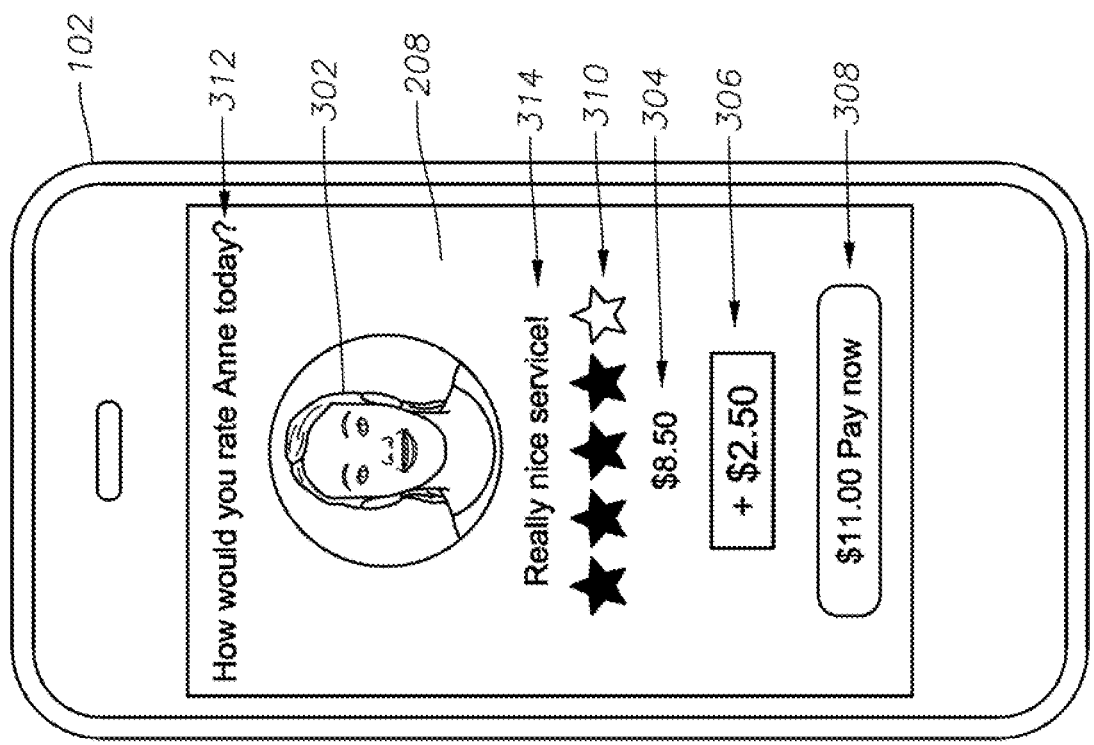

As previously described, the merchant rating/tipping data may be input and output in a variety of ways via touchscreen 208. The merchant rating data may be entered, for example, as star ratings, facial expressions, textual wording, voice entries, etc. FIG. 3B is another block diagram of an exemplary mobile communications device 102 whereby the rating data 310 is entered as 4-stars, a corresponding "really nice service!" textual rating 314, along with a corresponding facial expression of merchant 302. Either form of merchant rating data may be entered by the user. FIG. 3C is yet another block diagram of an exemplary mobile communications device 102 whereby the rating data 310 is entered as 5-stars, a corresponding "awesome!" textual rating 314, along with a corresponding facial expression of merchant 302. As can be seen by comparing FIGS. 3A-3C, the facial expressions of merchant 302 are different to correspond to the entered star rating. However, in alternative embodiments, either form of merchant rating data may be entered by the user.

In yet other illustrative embodiments, after the merchant rating data has been entered, communications device 102 may determine a level of service which corresponds to the rating data. The level of service may be reflected as a facial expression, textual wording, star rating, etc. and displayed to the user as a pop-up or some other display form. Nevertheless, communications device 102 then prompts the user (e.g., via textual wording) to confirm whether the displayed level of service was received, whereby the user can reply by selecting a "yes" or "no" icon, for example. If "yes" is entered, communications device 102 may then proceed to process the payment. However, if "no" was entered, communications device 102 may prompt the user via touchscreen 208 to enter again the rating data 310 or otherwise determine a suitable merchant rating and/or tip amount according to other methods described herein.

In other illustrative embodiments, rating data for various merchants entered by all users on network 100 may be compiled and stored accordingly on network storage or on each communication device 102 using, for example, a client-server network architecture. Thereafter, rating profiles for the merchants can be generated using the compiled data. The rating profiles may be used for a variety of consumer applications, such as, for example, store or employee reviews, merchant rating websites, or social sites. Moreover, the merchant data (tipping/rating) may be updated in real-time using data directly from other communications devices 102 via P2P sessions 104 (FIG. 1) or over network 108 via connections 106 (FIG. 1).

Furthermore, additional information can be determined from the tip amount or merchant ratings, such as, for example, whether the tip/rating is based primarily on service, type of merchant establishment (e.g., fancy restaurant vs. deli counter), items ordered (e.g., corkage, drinks, etc.), and a variety of other factors (e.g., first date, with friends, with potential business clients, etc.). For example, the determination of a tip amount or a merchant rating may be based on various data, including, but not limited to, time of year (e.g., right after a payday, holiday season, right before tax day, etc.), companion(s), occasion, and location. In yet other examples, a tip (based on the rating) or a rating (based on the tip) at the same restaurant with the same service may vary based on the specific data associated with the visit and can be different from the user's past history at the same restaurant. For example, the user may tip 30% while with a first date, but only usually tips 15% generally at the restaurant. In such cases, the 30% tip may not necessarily equate to a higher rating and may instead equate to the same rating as the 15% tip (since the tip was given while on a first date). Those ordinarily skilled in the art having the benefit of this disclosure will realize there are many merchant data analysis methods which can be adapted by the present disclosure.

As can be seen from throughout the present description, the embodiments discussed herein provide a significant advantage over conventional computer-based merchant rating systems. Unlike conventional systems that simply allow users to enter abstract ratings with no consideration of a given tip amount, user/merchant history, etc., the present disclosure provides the advantage of a computer-based system which considers a user's/merchant's historical profile, personal circumstances, location, etc. when determining a suggested rating and/or tip amount. The computer-based systems herein allow the suggested rating/tips to be determined in real-time using data stored on the mobile device itself, a remote storage device, or on another mobile device connected to the network. As a result, through use of such historical and real-time comprehensive data, the system provides a more accurate indication of merchant performance and customer satisfaction.

Figure 4:
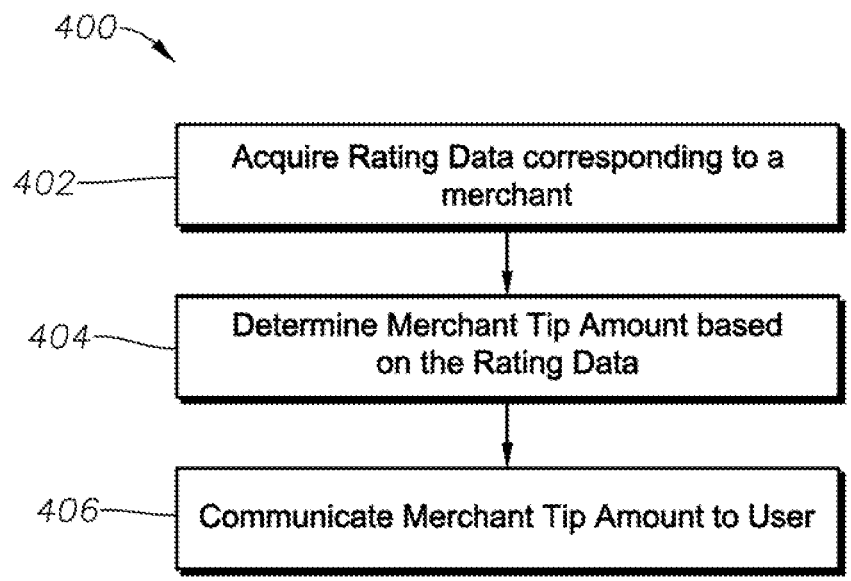
FIG. 4 is a flow chart for a method to determine a merchant tip amount according to certain methods of the present disclosure.

Turning now to FIG. 4, a flow chart illustrates a method 400 for determining a merchant tip amount. Method 400 will be described with respect to a mobile communications device 102 for simplicity of discussion. It is understood that additional steps can be provided before, during, and after the steps of method 400, and that some of the steps described can be replaced or eliminated for other embodiments of the method 400.

At block 402, mobile communications device 102 establishes a merchant transaction session whereby merchant rating data is acquired from a user. The merchant rating data can be entered via a touchscreen or other suitable user interface, as described herein. At block 404, mobile communications device 102 then determines a merchant tip amount that corresponds to the acquired merchant rating data. The merchant tip amount may be determined using historical or real-time data, or calculated in real-time, as described herein. For example, in addition to the other methods described above, the merchant tip amount may simply be calculated as 10% of the bill amount if the historical data reflects this percentage as being customary for the area. The customary tip amount, as defined herein, refers to a tip amount determined based upon the local customs or usual practices associated with the area in which the merchant is located, the local society or other sets of circumstances specific to the merchant or area. Nevertheless, after the merchant tip amount is determined, it is communicated to the user via the user interface at block 406.

With reference back to FIGS. 3A-3C, alternative methods of the present disclosure will now be described. In the method of FIG. 4, a merchant tip amount was determined based upon merchant rating data acquired from a user. However, in the alternative methods now described, a merchant rating is determined using an acquired tip amount. In FIG. 3A, for example, after bill amount 304 was determined; the user can enter a desired tip amount 306. After desired tip amount 306 is entered, communications device 102 (via tipping/rating engine 214) then determines the corresponding merchant rating. For example, if the user were to enter a tip of $0.00, communications device 102 then analyzes the historical and/or real-time merchant data on network 100 (in network storage or other communication devices) which corresponds to the desired tip amount of $0.00, whereby the corresponding merchant rating is determined and displayed. As previously described, the merchant ratings may be displayed as, for example, star ratings 310, textual wording 314 or facial expressions of merchant 302.

Any of the methods by which the merchant tip amount was determined above may be used to determine the merchant rating also. In a first example, after the tip amount is entered, the communications device may compare it to historical merchant tip amounts paid by the user or a user having a similar profile. Once a match or substantial match is located, the corresponding merchant rating for that tip amount is then output as the suggested merchant rating. Here, as in other examples described herein, the system may limit the search to the same merchant presently being paid, other merchants in the area, or similar merchants remotely located, for example.

Moreover, in certain illustrative embodiments, the user's data profile may be used to normalize the suggested tip amount or rating data over time. For example, if a user normally gives x % tip to a certain merchant that corresponds to excellent service, over time the system can normalize this tip amount to instead correspond to an average service—and vice versa for an entered merchant rating.

In a second example, the merchant tip paid when in the presence of a second user may be used to determine the corresponding merchant rating given. Here, for example, after the tip amount is entered and the presence of the second user is detected in the vicinity of the first user, the system determines the historical merchant rating given for the entered tip amount when the second user was present, which is the output as the suggested merchant rating. In a third example, the location of the communications device may be used to determine the merchant rating when a certain tip amount is entered. Here, for example, after entry of the tip amount, the system determines the location of the communications device and the customary merchant ratings given for the entered tip amount, which is then output as the suggested merchant rating.

Moreover, as previously described, after the merchant rating data is determined, communications device 102 and/or network 102 (via some server unit, e.g.) may compile the rating data in a merchant profile for later use (e.g., consumer service data). Such later use may be, for example, to compare a merchant's total tip amounts or average ratings. In addition, after determination of the merchant rating, communications device 102 may prompt the user to confirm the corresponding level of service was received, as previously described.

Moreover, note that the communication devices and networks described herein may perform the automatic tipping and/or rating methods in a variety of ways. For example, when a tip amount is entered by a user, the system may search historical tip amount data for that same tip amount or for the tip amount % of the bill (e.g., when the user paid x % to this merchant or a similar merchant). The same is true when the system is determining a tip amount based on the entered merchant rating data. Based on the merchant rating data, the system can determine exact tip amounts paid or the tip % paid. These and other alterations of the present disclosure will be readily apparent to those ordinarily skilled in the art having the benefit of this disclosure.

Figure 5:
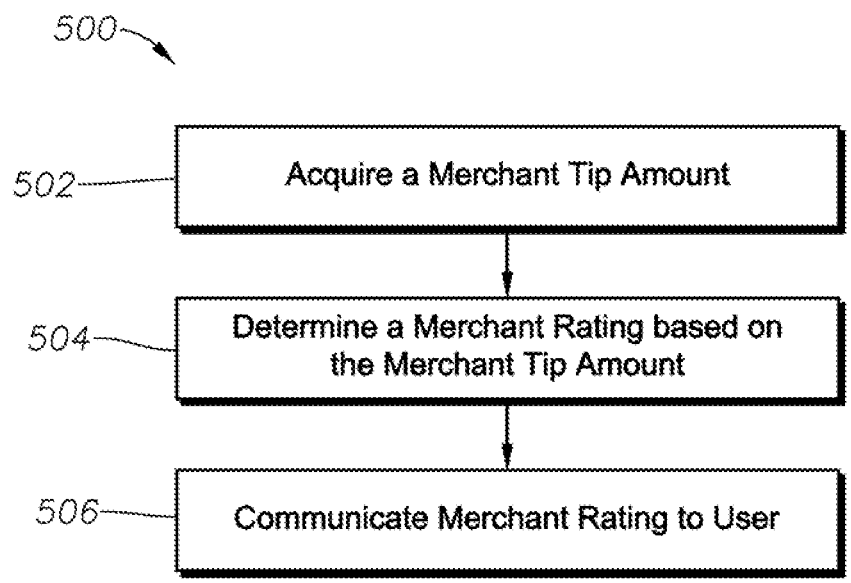
FIG. 5 is a flow chart for a method to determine a merchant rating according to certain methods of the present disclosure.

Turning now to FIG. 5, a flow chart illustrates a method 500 for determining a merchant rating. Method 500 will be described with respect to a mobile communications device 102 for simplicity of discussion. It is understood that additional steps can be provided before, during, and after the steps of method 500, and that some of the steps described can be replaced or eliminated for other embodiments of the method 500.

At block 502, mobile communications device 102 establishes a merchant transaction session whereby a merchant tip amount is acquired from a user. The merchant tip amount can be entered via a touchscreen or other suitable user interface, as described herein. At block 504, mobile communications device 102 then determines a merchant rating that corresponds to the acquired merchant tip amount. The merchant rating may be determined using historical or real-time data, as described herein. After the merchant rating is determined, it is communicated to the user via the user interface at block 506.

Figure 6:
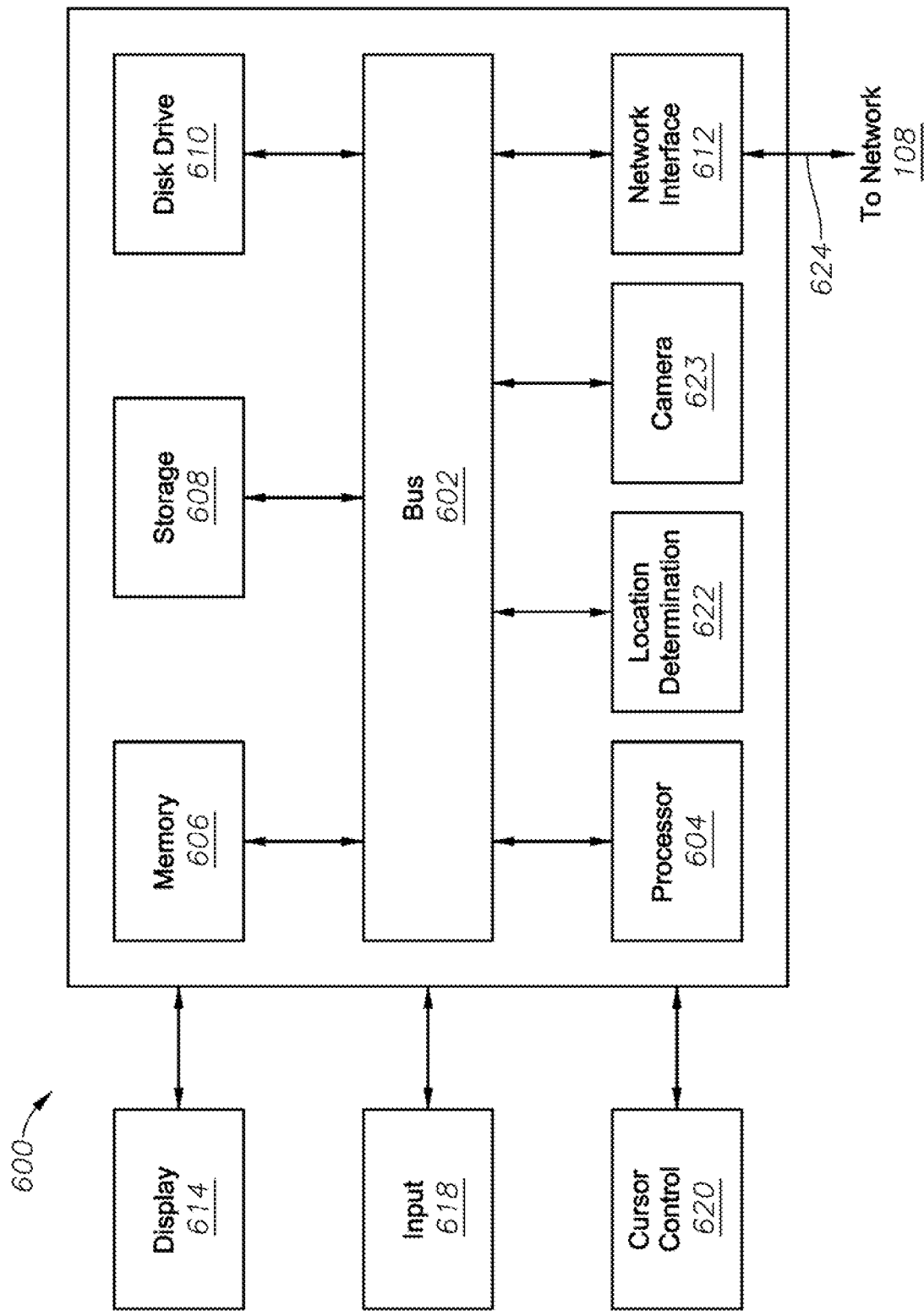
FIG. 6 is a schematic view illustrating an embodiment of a computing system for use with the present disclosure.

Referring now to FIG. 6 an embodiment of a computer system 600 suitable for implementing, for example, the mobile communications devices, mobile or other user devices, servers, etc., is illustrated. It should be appreciated that other devices utilized by users, payment service providers, point of sale operators, and/or merchants/stores in the system discussed above may be implemented as the computer system 600 in a manner as follows.

In accordance with various embodiments of the present disclosure, computer system 600, such as a mobile device, computer and/or a server, includes a bus 602 or other communication mechanism for communicating information, which interconnects subsystems and components, such as a processing component 604 (e.g., processor, micro-controller, DSP, etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT or LCD), an input component 618 (e.g., keyboard, keypad, or virtual keyboard), a cursor control component 620 (e.g., mouse, pointer, or trackball), a location determination component 622 (e.g., a Global Positioning System (GPS) device as illustrated, a cell tower triangulation device, and/or a variety of other location determination devices known in the art), and/or a camera component 623. In one implementation, the disk drive component 610 may comprise a database having one or more disk drive components.

In accordance with embodiments of the present disclosure, the computer system 600 performs specific operations by the processor 604 executing one or more sequences of instructions contained in the memory component 606, such as described herein with respect to the mobile communications devices, mobile devices, and/or servers. Such instructions may be read into the system memory component 606 from another computer readable medium, such as the static storage component 608 or the disk drive component 610. In other embodiments, hard-wired circuitry may be used in place of or in combination with software instructions to implement the present disclosure.

Logic may be encoded in a computer readable medium, which may refer to any medium that participates in providing instructions to the processor 604 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 610, volatile media includes dynamic memory, such as the system memory component 606, and transmission media includes coaxial cables, copper wire, and fiber optics, including wires that comprise the bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 600. In various other embodiments of the present disclosure, a plurality of the computer systems 600 coupled by a communication link 624 to the network 108 (e.g., such as a LAN, WLAN, PTSN, and/or various other wired or wireless networks, including telecommunications, mobile, and cellular phone networks) may perform instruction sequences to practice the present disclosure in coordination with one another.

The computer system 600 may transmit and receive messages, data, information and instructions, including one or more programs (i.e., application code) through the communication link 624 and the network interface component 612. The network interface component 612 may include an antenna, either separate or integrated, to enable transmission and reception via the communication link 624. Received program code may be executed by processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Accordingly, the illustrative embodiments described herein automatically tie together tipping and rating. When a certain tip is entered, the system translates it to a merchant rating while taking into account a variety of historical, real-time and local customary merchant data. Such data can be personalized to users and/or merchants. The system will generate a suggested appropriate tip amount so the user can see what his/her entered rating is worth. At the same time, the system will generate a suggested appropriate merchant rating so the user can see what level of service his/her entered tip amount corresponds to.

Moreover, there are additional advantages to the present disclosure. An employer can understand better which service level each employer reaches because connecting tips with ratings makes it more honest and transparent. Also, the ratings may be anonymous or attributed to the user if permission is given to do so. Moreover, dummy or fake merchant reviews can be reduced by automatically determining merchant ratings as described herein. Also, if a user travels a lot, he/she does not have to struggle with foreign currency or local customs when tipping—embodiments of the present disclosure will suggest the correct tip amount and/or rating.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art having the benefit of this disclosure will recognize that changes may be made in form and detail without departing from the scope of the present disclosure. Thus, the present disclosure is limited only by the claims.

What is claimed is:

1. A system, comprising:
a non-transitory memory; and
one or more hardware processors communicably coupled to the non-transitory memory and configured to read instructions from the non-transitory memory to cause the system to perform operations comprising:
determining a location of a first user mobile device associated with a first user using a global positioning system (GPS) of the first user mobile device;
acquiring a first tip amount corresponding to a merchant associated with the location via a user interface of the first user mobile device;
selecting a second user associated with the merchant at the location based on the location and a comparison between the first tip amount from the first user and a second tip amount corresponding to the merchant from the second user and a comparison between a profile of the second user and a profile of the first user;
determining rating data corresponding to the merchant given by the second user;
detecting wireless communications between the first user mobile device and a third user mobile device for a third user based on a device-to-device link established between the first user mobile device and the third user mobile device at the location;
determining, based on the wireless communications, that the third user mobile device is within a first distance to the first user mobile device;
detecting transaction data for a transaction associated with the first user mobile device and the third user mobile device at the location;
in response to the detecting the transaction data, determining a previous transaction between the first user mobile device and the third user mobile device;
determining, based on the previous transaction, a previous tip amount by the third user;
determining a merchant rating that corresponds to the first tip amount based at least on the rating data and the previous tip amount by the third user;
determining a proposed tip amount for the merchant based on the merchant rating and the determining that the third user mobile device is within the first distance;
outputting the merchant rating and the proposed tip amount to the first user via the user interface;
receiving a confirmation of the merchant rating via user input to the first user mobile device; and
compiling the merchant rating with additional merchant ratings in a merchant profile for the merchant.

2. The system of claim 1, wherein the merchant rating comprises:
a star rating corresponding to the first tip amount;
a facial expression corresponding to the first tip amount; or
textual wording corresponding to the first tip amount.

3. The system of claim 1, wherein determining the merchant rating comprises determining a historical merchant rating the first user has given that corresponds to the first tip amount, wherein the merchant rating is further based on the historical merchant rating.

4. The system of claim 3, wherein the operations further comprise:
determining a second historical merchant rating the first user has given the merchant when the third user was within the first distance of the first user,
wherein the merchant rating is further based on the second historical merchant rating.

5. The system of claim 1, wherein determining the merchant rating comprises:
determining a customary merchant rating which corresponds to the location and the first tip amount, wherein the merchant rating is also based on the customary merchant rating.

6. The system of claim 1, wherein the operations further comprise:
determining a level of service that corresponds to the merchant rating;
prompting the first user to confirm whether the corresponding level of service was received; and
when the corresponding level of service was not received, communicating a different merchant rating to the first user.

7. The system of claim 1, wherein the operations further comprise:
accessing the additional merchant ratings for a plurality of users that corresponds to the merchant; and
generating the merchant profile for the merchant based upon the additional merchant ratings.

8. The system of claim 1, wherein the operations further comprise, based on communicating the merchant rating to the first user, providing the first user, via the user interface, an option to alter the merchant rating.

9. The system of claim 8, wherein the operations further comprise, updating the merchant profile of a merchant rating website based on the option selected by the first user.

10. A non-transitory computer-readable medium having stored thereon machine-readable instructions executable to cause a machine to perform operations comprising:
determining a location of a first user mobile device associated with a first user using a global positioning system (GPS) of the first user mobile device;
acquiring a first tip amount, the first tip amount being received through the first user mobile device at the location;
selecting a second user associated with a merchant at the location based on the location and a comparison between the first tip amount from the first user and a second tip amount corresponding to the merchant from the second user and a comparison between a profile of the second user and a profile of the first user;
determining rating data corresponding to the merchant given by the second user;
detecting wireless communications between the first user mobile device and a third user mobile device for a third user based on a device-to-device link established between the first user mobile device and the third user mobile device at the location;
determining, based on the wireless communications, that the third user mobile device is within a first distance to the first user mobile device;
detecting transaction data for a transaction associated with the first user mobile device and the third user mobile device at the location;
in response to the detecting the transaction data, determining a previous transaction between the first user mobile device and the third user mobile device;
determining, based on the previous transaction, a previous tip amount by the third user;
determining a merchant rating that corresponds to the first tip amount based at least on the rating data and the previous tip amount by the third user;
determining a proposed tip amount for the merchant based on the merchant rating and the determining that the third user mobile device is within the first distance; and
outputting the merchant rating and the proposed tip amount to the first user via a user interface of the first user mobile device.

11. The non-transitory computer-readable medium of claim 10, wherein operations further comprise:
determining a historical merchant rating the first user has given the merchant when the third user was within the first distance of the first user,
wherein the merchant rating is further based on the historical merchant rating.

12. The non-transitory computer-readable medium of claim 10, wherein determining the merchant rating further comprises:
determining a customary merchant rating which corresponds to the location and the first tip amount, wherein the merchant rating is also based on the corresponding customary merchant rating.

13. The non-transitory computer-readable medium of claim 10, wherein the operations further comprise:
   determining a level of service that corresponds to the first tip amount;
   prompting the first user to confirm whether the corresponding level of service was received; and
   when the corresponding level of service was not received, communicating a different merchant rating to the first user.

14. The non-transitory computer-readable medium of claim 10, wherein the operations further comprise:
   receiving a confirmation of the proposed tip amount via user input to the first user mobile device;
   generating a merchant rating profile based upon the first tip amount; and
   compiling the first tip amount with additional tip amounts in a merchant profile for the merchant.

15. A method, comprising:
   receiving a location of a first user mobile device associated with a first user determined using a global positioning system (GPS) of the first user mobile device;
   receiving a first tip amount via a user interface of the first user mobile device while the first user is at the location;
   selecting a second user associated with a merchant at the location based on the location and a comparison between the first tip amount from the first user and a second tip amount corresponding to the merchant from the second user and a comparison between a profile of the second user and a profile of the first user;
   determining rating data corresponding to the merchant given by the second user;
   accessing data of the first user comprising past transactions of the first user that include a merchant tip amount and a corresponding rating;
   determining a merchant rating based at least in part on the data and the rating data;
   detecting wireless communications between the first user mobile device and a third user mobile device for a third user based on a device-to-device link established between the first user mobile device and the third user mobile device at the location;
   determining, based on the wireless communications, that the third user mobile device is within a first distance to the first user mobile device;
   detecting transaction data for a transaction associated with the first user mobile device and the third user mobile device at the location;
   in response to the detecting the transaction data, determining a previous transaction between the first user mobile device and the third user mobile device;
   determining, based on the previous transaction, a previous tip amount by the third user;
   determining a merchant rating that corresponds to the first tip amount based at least on the merchant rating and the previous tip amount by the third user;
   determining a proposed tip amount for the merchant based on the merchant rating and the determining that the third user mobile device is within the first distance; and
   outputting the merchant rating and the proposed tip amount to the first user via the user interface.

16. The method of claim 15, wherein the data further comprises a type of merchant corresponding to the merchant tip amount and corresponding rating.

17. The method of claim 15, wherein the determination of the merchant rating is further based on a time or a day the first tip amount is received.

18. The method of claim 15, wherein the determination of the merchant rating is further based on local customs of the location of the merchant.

19. The method of claim 15, further comprising generating a merchant profile based on the merchant rating.

20. The method of claim 15, further comprising:
   receiving a confirmation of the merchant rating via user input to the first user mobile device; and
   compiling the merchant rating with additional merchant ratings in a merchant profile for the merchant.

* * * * *